UNITED STATES PATENT OFFICE.

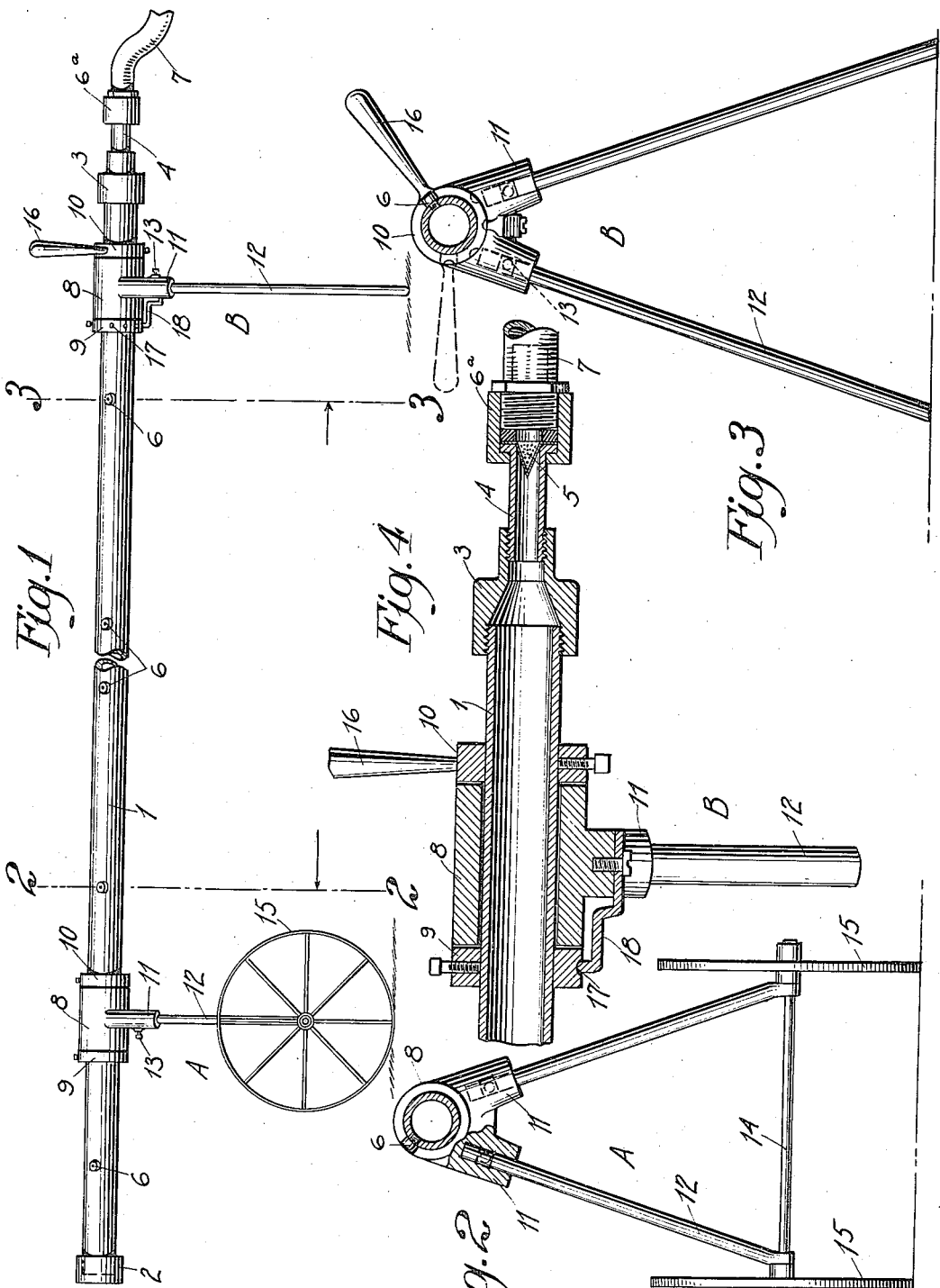

GUSTAVE JOHN NIKOLA, OF GLEN COVE, NEW YORK.

PORTABLE LAWN AND GARDEN SPRINKLER.

1,129,713.  Specification of Letters Patent.  Patented Feb. 23, 1915.

Application filed July 23, 1914. Serial No. 852,733.

*To all whom it may concern:*

Be it known that I, GUSTAVE J. NIKOLA, a citizen of the United States, and a resident of Glen Cove, in the county of Nassau and State of New York, have invented a new and Improved Portable Lawn and Garden Sprinkler, of which the following is a full, clear, and exact description.

This invention relates to sprinkling devices for lawn and garden use and relates more particularly to that type in which a plurality of spraying nozzles are employed whereby a large area can be sprayed at one time, the water being discharged from the apparatus in the form of a fine mist, so that the ground and vegetation will be moistened in a manner closely approximating nature.

The invention has for its general objects to improve and simplify the construction and operation of apparatus of this character so as to be reliable and efficient in use, comparatively simple and inexpensive to manufacture and so designed as to water an extremely large area from one position of the apparatus.

A further object of the invention is the provision of a portable sprinkler or spraying device which is in the form of a horizontal pipe having a plurality of spaced spraying nozzles, and supports carry the ends of the pipe in such a manner that the latter can be turned on its axis to direct the nozzles to one side or the other so that the ground and vegetation at either side of the pipe can be sprayed without the position of the apparatus being changed, one of the supports including wheels so that the apparatus can be conveniently transported from place to place.

With such objects in view and others which will appear as the description proceeds, the invention comprises various novel features of construction and arrangement of parts which will be set forth with particularity in the following description and claims appended hereto.

In the accompanying drawing, which illustrates one embodiment of the invention, and wherein similar characters of reference indicate corresponding parts in all the views, Figure 1 is a side view of the apparatus; Fig. 2 is a transverse section on the line 2—2, Fig. 1; Fig. 3 is a transverse section on the line 3—3, Fig. 1; and Fig. 4 is a longitudinal section through the nozzle pipe and supporting bearing adjacent the receiving end of the pipe.

Referring to the drawing, 1 designates a section of metal pipe of any suitable length and diameter, it being found in practice that a three-quarter inch pipe twenty feet long is satisfactory. One end of this pipe is closed by a cap 2 and the other end is provided with a reducer coupling 3 for connection with a nipple 4 that contains a strainer 5 for preventing clogging of the spraying nozzles 6, and this nipple 4 has a hose coupling or union 6ª whereby an ordinary garden hose 7 can be connected with the nozzle-carrying pipes 1. The nozzles 6 are of any approved construction and they are so designed as to deliver water not in the form of a jet but fine clouds of mist, and any desired number of nozzles may be employed in suitable spaced relation, and they are arranged in a single longitudinal line, so that by turning the pipe on its axis the nozzles can be caused to direct clouds of mist to either side of the pipe, so that a double area can be watered without bodily changing the position of the pipe. However, the nozzles may be arranged in any other position on the pipe 1 from that shown and described.

The pipe 1 is supported off the ground by front and rear supports A and B. Each support includes a head 8 in the form of a sleeve in which the pipe 1 is loosely mounted, and on the pipe are collars 9 and 10 which engage the ends of the sleeve 8 so as to prevent relative axial movement, while allowing the pipe to be freely turned. The head or sleeve 8 has downwardly-extending hollow bosses or sockets 11 into which are fastened legs 12 which are rendered removable by employing set-screws 13 in the sockets 10 to jam against the inserted ends of the legs. The legs of the front support A have fastened to the lower ends a horizontal axle 14 on the ends of which are wheels 15 whereby the sprinkling apparatus can be readily moved from place to place by lifting the rear support B off the ground and pushing the apparatus, as in moving a wheelbarrow or pushcart. The legs 12 of the rear device B are long enough to rest on the ground while the pipe 1 is supported in substantially horizontal position. The collar 10 at the inlet end of the pipe 1 is provided with a handle 16 whereby the attendant can readily turn the pipe 1 for spraying the area at the right or left thereof. It may be desirable to employ locking means for holding the pipe 1 in different positions of adjustment, and for this purpose the collar 9 at the inlet end of the pipe 1 is provided with apertures 17 into any one of which engages a spring catch 18, fastened to the sleeve 8. By turning the handle 16 the catch 18 readily yields to disengage the aperture 17 in which it was entered, and when a new aperture alines therewith the catch will snap into it and hold the pipe 1 against accidental turning. In moving the apparatus from place to place the attendant can grasp the nipple pipe 4 or the adjacent end of the pipe 1 as a handle, whereby the pipe 1 is raised high enough to free the legs 12 from the ground while the wheels 15 support the weight of the pipe at the other end, and now the apparatus is either pushed or pulled to any other point desired.

From the foregoing description taken in connection with the accompanying drawing, the advantages of the construction and method of operation will be readily understood by those skilled in the art to which the invention appertains, and while I have described the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A spraying or sprinkling device comprising a pipe having spaced nozzles thereon, sleeves forming bearings in which the pipe is rotatable, means on the pipe engaging with the sleeves to prevent relative longitudinal movement, sockets depending from the sleeves and disposed in angular relation to each other, a member having its upper end fastened in each socket, an axle connected with the members of one sleeve, wheels on the axle, the members of the other sleeve forming legs adapted to rest on the ground and longer than the other members, whereby the pipe will be substantially horizontal, and means for adjusting the position of the pipe in the said sleeves to change the direction in which the nozzles discharge.

2. A spraying or sprinkling device comprising a pipe having spaced discharging devices thereon, sleeves forming bearings in which the pipe is rotatably mounted, means preventing longitudinal movement of the pipe in the sleeves, a pair of means on each sleeve for holding legs, a pair of legs secured to each sleeve by said means thereof, one pair of legs being longer than the other, and wheels connected with the shorter pair of legs, the diameter of the wheels being such that the pipe will be supported substantially horizontal, and means for connecting a hose with the pipe to supply water thereto.

In testimony whereof I have signed my name to this specification in the presence of two subscribing witnesses.

GUSTAVE JOHN NIKOLA.

Witnesses:
H. W. VAN WAGNER,
HELEN R. RYAN.